Aug. 13, 1968 A. S. BAXTER ET AL 3,396,819
LUBRICATION OF CONNECTING ROD BIG-END BEARINGS
Filed Nov. 1, 1965

United States Patent Office 3,396,819
Patented Aug. 13, 1968

3,396,819
LUBRICATION OF CONNECTING ROD
BIG-END BEARINGS
Allan S. Baxter, Joseph F. Warriner, and Peter M. Jeffery,
Lincoln, England, assignors to Ruston & Hornsby
Limited, Lincoln, England, a company of Great Britain
Filed Nov. 1, 1965, Ser. No. 505,885
Claims priority, application Great Britain, Nov. 7, 1964,
45,484/64
6 Claims. (Cl. 184—6)

ABSTRACT OF THE DISCLOSURE

In the lubrication of undirectionally loaded bearings between the crank pin of a reciprocating piston engine and the large end of a connecting rod, a cam and follower mechanism between relatively oscillating parts relieves the bearing load to allow entry of lubricant.

Figure 1:
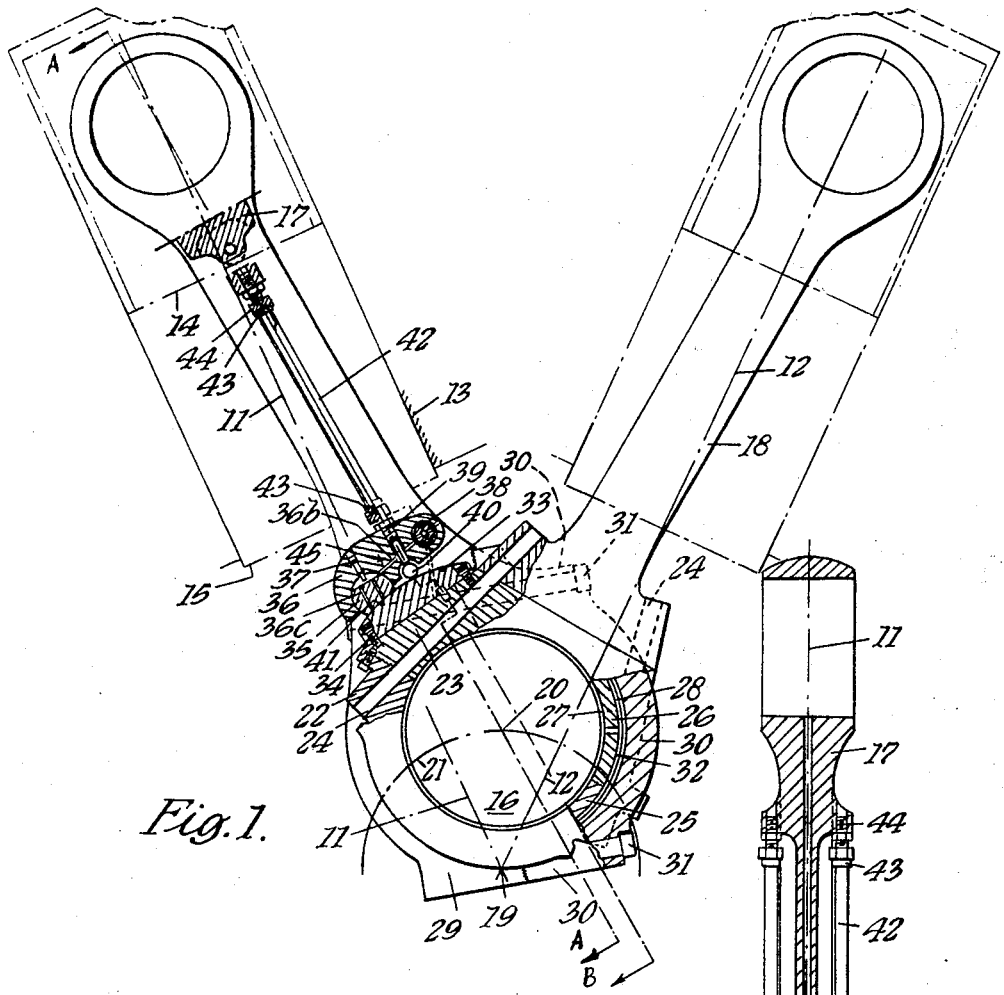

This invention relates to a bearing of the kind comprising a pin, and a bush or shell embracing the pin, so that the one is capable of an oscillatory movement about their common axis relatively to the other.

The problem with which the invention is concerned is that of the adequate lubrication of certain parts of the mating surfaces of the pin and its bush or shell, which parts are difficult of lubrication because of being in a continuous state of heavy loading.

More particularly, the invention relates to engines, pumps, compressors, and the like machines having reciprocating pistons, each piston being connected to a crankshaft by a connecting rod which at its big-end embraces a crank pin. There, especially in those working on a two-stroke cycle, the loading on the crank pin bearing tends to be unidirectional, that is to say, there is a substantially continuous compressive radial load on part of the pin and the mating part of its bearing during operation; and the lubricating oil has little chance of flowing to that part of the bearing.

In the case of the blade-rod bearing on a two-stroke V-form internal-combustion engine which has a fork-and-blade-type connecting-rod big-end bearing arrangement, the mating surfaces of the blade-rod big-end bearing operate under the following conditions: they have a small amplitude of oscillation combined with a small swing of the load vector, which can be considered as generally unidirectional.

Under these conditions, especially in a highly rated engine, the bearings operate on boundary film lubrication. Since the boundary film is extremely thin, any surface irregularities between the mating surfaces tend to rupture the oil film, which can result in bearing failure.

It is obviously undesirable that some part of a bearing for an angularly moving pin should suffer any restriction in respect of the supply of lubricant, especially when that part is under pressure; and it is an object of the present invention to obviate or at least reduce this disadvantage. This the invention does by arranging for the pressure between parts of the bearing-bush or shell and the associated pin to be relieved mechanically at an interval or intervals in the cycle of motion whereby the bearing surfaces are parted so that lubricant can flow into the space so created to lubricate and incidentally cool the surfaces with which it is in contact.

This invention, positively separating the mating surfaces at a certain time in the operating cycle and thereby allowing oil to enter between the said surfaces, promotes squeeze-film lubrication conditions. Since the squeeze-film is relatively thick, minor imperfections in the mating surfaces can be tolerated because they do not rupture the oil film and therefore the mating surfaces do not touch.

Figure 2:
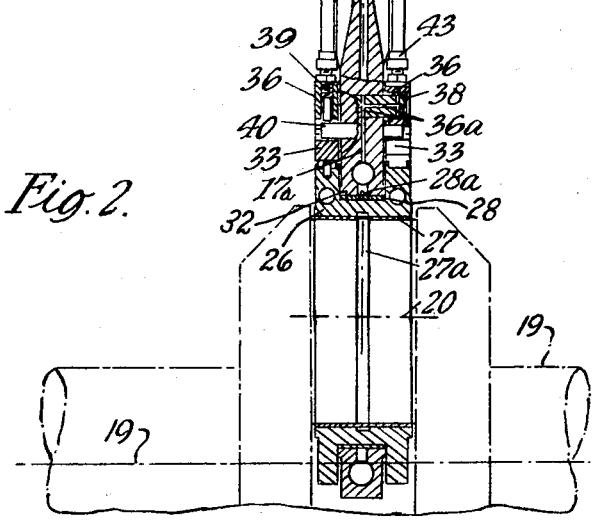

The following description relates to the accompanying drawings, showing, by way of example only, one embodiment of the invention. In the drawings:

FIGURE 1 is a partly sectioned elevation of a fork-and-blade connecting-rod arrangement for a V-form internal-combustion engine, showing means for lubrication for the blade-rod big-end bearing according to the invention; and FIGURE 2 is a composite section on lines A—A and A–B of FIGURE 1.

The invention is shown in the drawings as applied to an engine having pairs of cylinders, the two cylinders of each pair being arranged in V formation, so that the centre-line of what may be called the left-hand cylinder in the drawing is indicated at 11 and the centre-line of the right-hand cylinder at 12. The left-hand cylinder liner is indicated at 13. Within the cylinder liner reciprocates a conventional piston indicated in dotted line in FIG. 1, so that the piston skirt moves between a top dead-centre position 14 and the bottom dead-centre position 15. A similarly conventional arrangement of piston cylinder and liner also shown in dotted line in FIGURE 1 applies also to the right hand part of the drawing. The two pistons are connected with a common crank pin 16 by conventional pivoted wrist-pin connections (not shown) with the small ends of connecting rods 17 and 18. The following is a description of the pivoted connections between the two rods and the crankshaft. The left-hand connecting rod 17 is of the blade type, having its big-end in the form of a single blade; and the right-hand connecting rod 18 is of the fork type having its big-end in the form of two spaced parallel "prongs" which embrace or sandwich between them the single blade of the left-hand rod 17. The crank pin 16 is part of the crankshaft (not shown having an axial centre 19, being the point of intersection of the cylinder centre-lines 11 and 12. The centre 20 of the crank pin 16 revolves about the centre 19 of the crankshaft on a circular locus 21, and of course as the pin revolves so it rotates on its own axis 20. The two spaced prongs of the fork-rod consist of bottom halves 22 and top halves 23, secured together and to the fork-rod 18 itself, by bolts (not shown) passing through holes 24. The space between the prongs is bridged by a circular ring in two halves 25 and 26 respectively integral with halves 22 and 23, on the inner peripheral surface of which a fork-rod bearing-shell 27 is held, and with the outer peripheral surface of which co-operates the blade-rod bearing-shell 28. The blade-rod big-end consists of two parts, namely a left-hand part 29 integral with the rod 17 itself and a right-hand part or cap 30 secured to the left-hand part as by bolts 31.

Considering now the journal bearing mounting of the crank pin 16, and referring for this purpose to FIGURE 2 of the drawings, it will be seen that the outer periphery of the crank pin 16 (omitted from FIGURE 2 for clarity) is in contact with and continuously rotates with respect to the inner periphery of fork-rod bearing-shell 27 which is a tight fit within the two fork-rod bearing-block halves 22, 23. The outer peripheries 32 of the bearing ring halves 25 and 26 (where these halves underlie the blade of the blade-rod 17) are in contact with blade-rod bearing-shell 28, which is a tight fit within and between the blade end of rod 17 and its cap 30. Within the blade-rod 17 extend oil passages 17a; in the inner periphery of the shell 28 is a circumferential oil groove 28a; and in the inner periphery of the shell 27 is a circumferential oil groove 27a.

Thus when the engine is running in one direction, the crank pin 16 is continuously rotating about its own axis 20 as it revolves on circular locus 21 about the crankshaft axis 19; and being subjected to a continuous or unidirectional rotation it can be peripherally lubricated in any known way. On the other hand, the outer peripheral surface 32 of the fork-rod bearing-block, and the mating inner peripheral surface of the blade-rod bearing-shell 28 are subjected to a relative oscillatory movement of limited extent, say 20°; and, suffering a continuous unrelieved loading along a radius related to the centre-lines 11 and 12 of the cylinders, lack adequate lubrication in the vicinity of that radius. In other words, the unidirectional load directed toward the crankpin substantially along the line 11 causes part of the upper half of the bearing 32, 28, to lack lubrication.

The present invention seeks to improve on that inadequacy of lubrication by the means to be now described.

On a flat at the upper side of the fork-rod bearing-block top half 23 is a cam member 33, fixed by screws 34. (Actually of course there are two such cam members 33 one on either side of the blade-rod 17, as will be seen in FIGURE 2.) The cam profile of the member 33 is engaged by a cam-follower in the form of a slipper 35 of rod-like profile housed within a partially cylindrical recess in one end of a cam-follower-rocker 36, and retained axially by a screw 37 protruding into a slot in slipper 35. The rocker 36 is mounted at its further end on a fulcrum pin 38, rigid in blade-rod 17. At a suitable position between fulcrum pin 38 and slipper 35 on rocker 36 there is a back-cam clearance-adjusting screw 39, which at its bottom end contacts an abutment pin 40 rigidly attached to blade-rod 17, and which is locked in position to give a clearance 41 between slipper 35 and cam 33, when the angle between the two rods 17 and 18 is a minimum and crank pin 16 is at the lowest point of its locus 21. The top end of the adjusting screw 39 co-operates with an elastic link in the form of a tubular compression spring 42 fitted with part-spherical ends 43 and held in position on rod 17 and adjusted for length by adjusting screw 44.

Lublication to all moving surfaces on the rocker 36 and its associated parts is provided via passages 28a, 17a, 36a, 36b and 36c, from the main engine lubrication oil supply.

When the crankshaft rotates, the connecting rods 17 and 18 oscillate relatively to one another on bearing surface 32, since the axes 11 and 12 of the cylinder bores which guide the small-ends of the connecting rods via each piston are radial to the axis 19 of the crankshaft. This oscillation or angular movement causes the cam 33 to move relatively to slipper 35 and give a cyclical upward movement of blade-rod 17 in the direction of its axis relative to bearing surface 32.

This movement is transferred via rocker 36 oscillating on pin 38 to spring 42 via end 43 and screw 39. Load is thus transferred to the upper end of the blade-rod 17 which lifts along its axis relative to fork-rod bearing surface 32, to give clearance between shell 28 and surface 32. Thus, lubricating oil is allowed to enter the part of the bearing which normally does not have any clearance due to the generally unidirectional unrelieved load.

The cams and associated follower mechanisms are hereinafter referred to as "load reversing mechanism."

Spring 42 is designed to provide a means of limiting the load in the load reversing mechanism by absorbing the cam and follower movement elastically when the cam lift occurs under maximum downward load conditions.

On the compression stroke of the left-hand or "blade" piston, assuming screw 44 to be correctly adjusted, the initial movement at rocker 36 is partially absorbed by elastic compressive contraction in spring 42, following which the associated compression load is then transferred to connecting rod 17 via end 43 and screw 44 and acts upwardly along its axis. This upward load is to be timed on the compression stroke and is of a sufficiently large magnitude to be in excess of the downward load on bearing-shell 28, the downward load at that instant being at a minimum. The blade-rod 17 is thus caused to lift upwardly along its axis relative to the big-end bearing surface 32. This lift creates a clearance between the bearing-shell 28 and bearing surface 32 on the normally unidirectionally loaded portion of the bearing, thus allowing lubricant from the oil grooving to enter and produce conditions conducive to squeeze-film lubrication. Also, the timing and duration of this upward lift is such that it continues well into the expansion stroke. This feature is important for reversible engines, as it ensures that when the rotational direction of the engine is reversed, lift will occur on the compression stroke. On the expansion stroke, the said upward movement (if any) at rocker 36 is wholly absorbed in spring 42, because the associated upward load is less than the downward load caused by gas pressure on the engine piston.

If the slipper 35 were continuously loaded, the lubrication of the moving surfaces on rocker 36, slipper 35, and cam 33 would be poor, and would be similar to that in the blade-rod bearing prior to fitting of the load reversing mechanism. The invention prevents the occurrence of these conditions by providing a period of back-cam; that, is the period prior to the loading of spring 42, when there is clearance at 41, and the crank pin is at its lowest point. This back-cam clearance unloads the sliding surfaces associated with cam 33, but since this unloading occurs in the lower region of locus 21 when the mass of the load reversing mechanism is being retarded, or is thrusting downward, an inertia force would prevent oil entering the moving surfaces. The effects of such an inertia force are overcome by the provision of adjusting screw 39 to contact abutment pin 40 so that clearance is obtained when slipper 35 is on back-cam. At the same time clearance also appears on the upper portion of fulcrum pin 38, which is loaded when there is a load on spring 42, since rocker 36 is supported by pin 40. This pin 40 is so positioned between fulcrum pin 38 and the centre of gravity 45 of the rocker 36 that the inertia forces acting through the centre of gravity 45 give a moment about pin 40 which is resisted by an equal and opposite moment due to a force acting on the bottom portion of the bearing between pin 38 and rocker 36. Thus, all moving surfaces in the load reversing mechanism are cyclically relieved of load to allow adequate lubrication.

It will be understood that in the foregoing description terms such as "upper" and "lower" and "vertical" are used for convenience of identification only and without spatial significance.

It will be understood also that the invention may take other forms and that the forms shown may be variously modified. Thus, the cam-follower has been shown in the form of a slipper. This is desirable because of the high stresses developed hereabouts; but there is always the possibility of having the cam-follower as a roller.

We claim:

1. A machine comprising in combination a reciprocating piston, a connecting rod, a crank-shaft, a pivoted connection between said piston and the small-end of said connecting rod, a pivoted connection between a crank pin on said crank-shaft and the big-end of said connecting rod which pivotal connection includes a mating pair of peripheral bearing surfaces, and a cam-and-follower means adapted cyclically to relieve a pressure due to a generally unidirectional loading between the mating surfaces so as periodically to separate the mating surfaces and allow entry of lubricant between them.

2. A machine as claimed in claim 1 and comprising an elastic means through which the said cam-and-follower means is operative and which limits the pressure exerted by said cam-and-follower means when said generally unidirectional loading is other than at about its minimum.

3. A machine as claimed in claim 1 and comprising means for cyclically relieving pressure generated between the cam, the follower, and associated parts of the cam-and-follower means to allow lubrication thereof.

4. A machine as claimed in claim 1 and comprising first and second pistons connected to first and second connecting rods pivotally connected at their big-ends to a common crank pin.

5. A machine as claimed in claim 4 and in which said first and second connecting rods are of fork-and-blade type.

6. A machine as claimed in claim 5 in which said mating pair of peripheral surfaces are formed respectively on a fork-rod bearing shell and on a blade-rod bearing shell.

References Cited

UNITED STATES PATENTS

| | | | |
|---|---|---|---|
| 1,637,245 | 7/1927 | Scully | 184—6 |
| 1,981,870 | 11/1934 | Magdeburger | 184—6 X |
| 2,056,901 | 10/1936 | Kylen | 184—6 |
| 3,056,638 | 10/1962 | Hovde | 184—6 X |
| 3,069,926 | 12/1962 | Hoffman et al. | 184—6 X |
| 3,096,850 | 7/1963 | Rosenqvist | 184—6 |

FOREIGN PATENTS 1,037,761  8/1958  Germany.

HOUSTON S. BELL, JR., *Primary Examiner.*